UNITED STATES PATENT OFFICE.

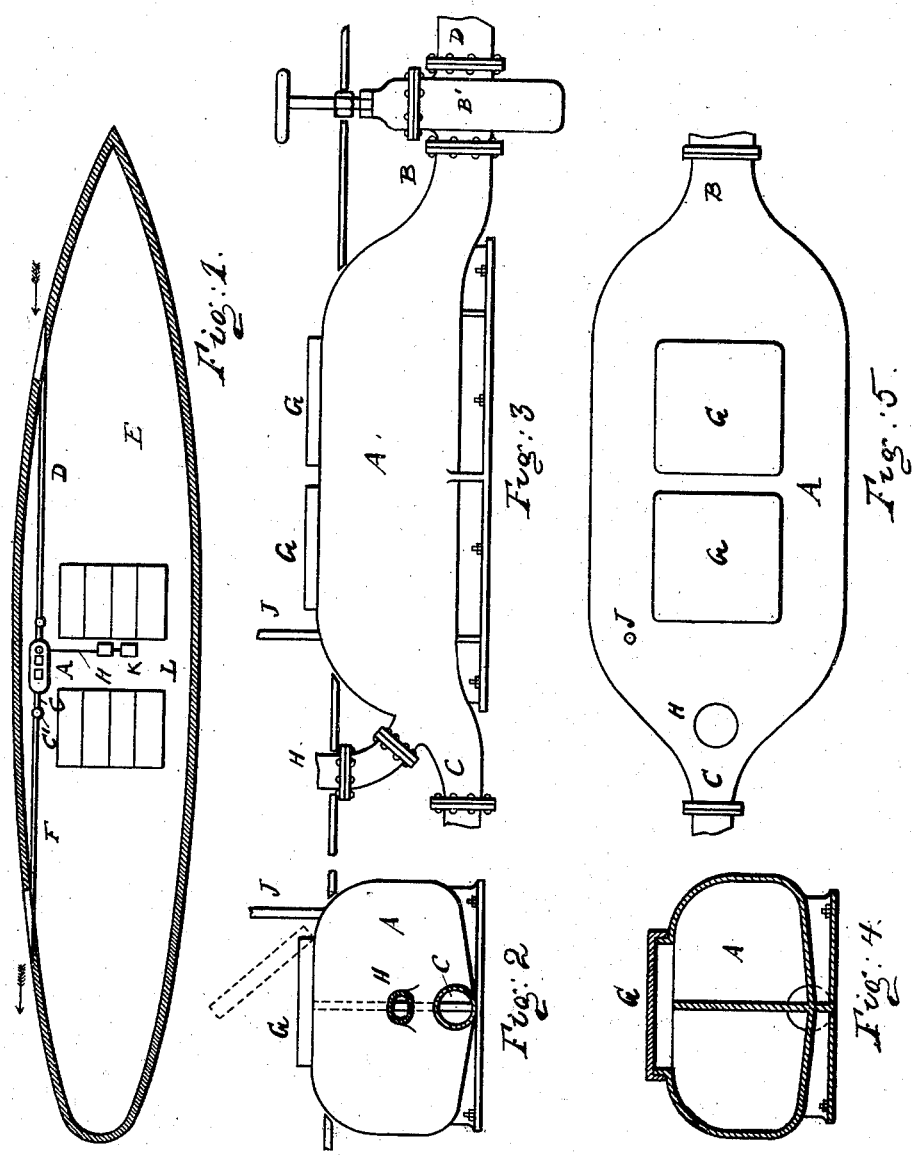

PENN E. COALE, OF RUTHERFORD, NEW JERSEY.

DEVICE FOR REMOVING ASHES FROM MARINE VESSELS.

SPECIFICATION forming part of Letters Patent No. 653,215, dated July 10, 1900.

Application filed February 15, 1900. Serial No. 5,314. (No model.)

*To all whom it may concern:*

Be it known that I, PENN E. COALE, a citizen of the United States, and a resident of the borough of Rutherford, in the county of Bergen and State of New Jersey, have invented certain new and useful Improvements in Devices for Removing Ashes from Marine Vessels, of which the following is a specification.

The object of this invention is to provide a new and improved device for removing ashes from the furnace-room of a marine vessel rapidly, reliably, and at a minimum cost.

In the accompanying drawings, forming a part of this specification, and in which like letters of reference indicate like parts in all the views, Figure 1 is a plan view of a marine vessel provided with the new and improved device for removing ashes from the furnace-room. Fig. 2 is an end view of the apparatus. Fig. 3 is a side view. Fig. 4 is a transverse section. Fig. 5 is a plan view.

A chamber A, preferably made of iron or steel and of sufficient size to hold about one ton or more of ashes, has its ends tapered from the sides and top to form the necks B and C at the ends of said chamber and at the bottom thereof, and said necks are provided with the valves B' and C', respectively, which may be gate-valves or valves of any other suitable construction. A pipe D extends from the neck B to the side of the marine vessel E, in which the apparatus is located, and terminates near the bow, the outer end of said pipe being open. A pipe F extends from the neck C to the side of the vessel and terminates at or near the stern, the outer end of said pipe being also open. The chamber A is provided in its top with one or more openings, which can be closed tightly by means of covers G, which may be secured in place by any suitable means. A pipe H is connected with the chamber A and is connected with a pump K or any other suitable water-elevating device, and J is a vent-pipe extending from the chamber up above the water-level. The chamber A is fixed on or below the floor of the furnace-room L of the vessel E, preferably near one side of the same, and the chamber A and pipes D and F are below the water-line.

The operation is as follows: The valves B' and C' are closed and the water pumped out of the chamber A. The covers G are removed and the ashes dumped or shoveled into the chamber A and the covers G firmly secured in place. The valves B' and C' are then opened, and the water, rushing through the pipes D, the chamber A, and the pipe F as the vessel speeds forward, carries the ashes from the chamber A out through the pipe F. The valves B' and C' are then again closed, the water pumped out of the chamber A, and the ashes are again filled into said chamber, and so on.

Having thus described the invention, what is claimed as new, and desired to be secured by Letters Patent, is—

The combination with a marine vessel, of a chamber in the same, below the water-line, pipes extending from the ends of said chamber to the sides of the vessel at the bow and stern and below the water-line and open at their outer ends, valves for closing said pipes, a cover for closing an opening in said chamber and means for removing water from said chamber, substantially as herein shown and described.

Signed at Morristown, in the county of Morris and State of New Jersey, this 13th day of October, A. D. 1899.

PENN E. COALE.

Witnesses:
JOHN BOYD,
SARAH E. COALE.